March 2, 1954 R. W. DOUGLAS ET AL 2,671,156
METHOD OF PRODUCING ELECTRICAL CRYSTAL-CONTACT DEVICES
Filed Oct. 10, 1951
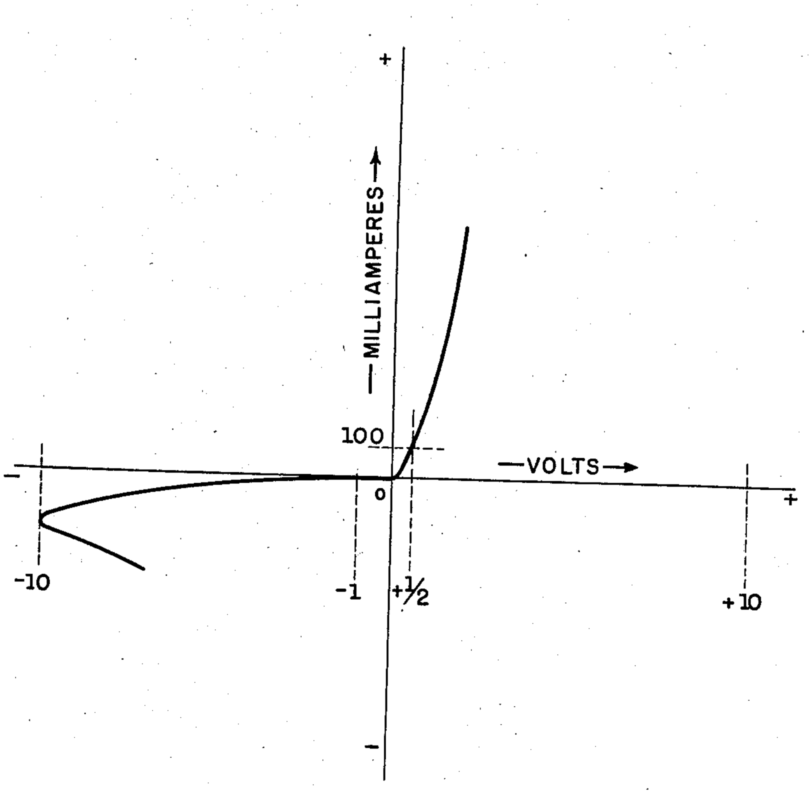
INVENTORS.
RONALD W. DOUGLAS
AUBREY O.E. LINDELL
BY Lawrence B. Dodds
ATTORNEY Patented Mar. 2, 1954

2,671,156

UNITED STATES PATENT OFFICE 2,671,156

METHOD OF PRODUCING ELECTRICAL CRYSTAL-CONTACT DEVICES

Ronald Walter Douglas and Aubrey O. E. Lindell, Wembley, England, assignors to Hazeltine Research, Inc., Chicago, Ill., a corporation of Illinois Application October 10, 1951, Serial No. 250,779

Claims priority, application Great Britain October 19, 1950

5 Claims. (Cl. 219—10)

*General*

This invention relates to methods of producing electrical crystal-contact devices and, more particularly, to methods of producing such devices of the type which comprises a germanium crystal and is suitable for use as a rectifier of alternating current as in radio receivers.

It is well known in the art that the effectiveness of electrical crystal-contact devices is indicated for some purposes by the ratio of the impedance presented by the device to current flow in one direction therethrough to that to current flow in the other direction. The lower impedance is known as the forward impedance of the device and the higher impedance is known as the reverse impedance thereof. As used throughout the specification and claims, the terms "lesser impedance" or "forward impedance" and "higher impedance" or "reverse impedance" of an electrical crystal-contact device refer to the impedances represented by the ratio of a unidirectional voltage applied to the device to a unidirectional current flow therethrough in response to the applied voltage. Accordingly, these impedances individually refer to voltage-current ratios corresponding to the ratios of the values of voltage and current coordinates at given points on a graph representing the voltage-current characteristic of the device. It is ordinarily desirable that the device exhibit a high ratio of reverse-to-forward impedance. For some applications, such as in telephone modulator circuits, however, it is also desirable that the forward impedance of the device be lower than has heretofore been obtainable. For such applications, the magnitude of the reverse impedance may not be critical.

It is an object of the present invention, therefore, to provide a new and improved method of producing an electrical crystal-contact device which avoids the aforementioned limitations of prior such devices.

It is a further object of the invention to provide a new and improved method of producing an electrical crystal contact device of the germanium type which has a very low forward impedance.

In accordance with the invention, the method of producing an electrical crystal-contact device comprises passing through a crystalline body of germanium and a contact element including a portion comprising gold maintained in intimate contact with the body an electric current of a higher order of magnitude than the normal conduction current of the device to fuse the contact element to the aforesaid body.

For a better understanding of the present invention, together with other and further objects thereof, reference is had to the following description taken in connection with the accompanying drawing, and its scope will be pointed out in the appended claims.

The drawing is a graph representing a characteristic of an electrical crystal-contact device constructed in accordance with the method of the present invention.

*Description of electrical crystal-contact device*

An electrical crystal-contact device, in accordance with one form of the invention, comprises a semiconductive crystalline body which preferably comprises essentially germanium and may also include a small amount of additives such as antimony or arsenic. In a preferred embodiment, the weight ratio of antimony to germanium is of the order of 1 to 10,000. This small quantity of antimony lowers the bulk resistance of the germanium body.

The crystal-contact device also includes a contact element including a portion comprising gold fused in intimate contact with the body of germanium by the passage of an electric current through the contact element and the germanium body to provide for the device at the contact point a low forward impedance of the order of 5 ohms to current flow through the device. The device preferably has a much higher reverse impedance, such as 20,000 ohms, to current flow through the device in the other direction. The contact element may be, for example, a gold wire or primarily of tungsten such as a gold-plated tungsten wire element and the above-mentioned portion of the contact element may comprise either gold or an alloy thereof. This portion of the contact element, which is in intimate contact with the body of germanium, preferably is so sharp that the contact element is in contact with the germanium body over a very small area thereof.

*Method of manufacture of electrical crystal-contact device*

During the manufacture of the electrical crystal-contact device, the device preferably is subjected to an electrical power treatment. More particularly, the method of producing an electrical crystal-contact device in accordance with the invention comprises passing through the crystalline body of germanium and the contact element including a portion comprising gold maintained in intimate contact with the germanium body an electric current of a higher order of magnitude than the normal conduction current of the device to fuse the contact element to that body. Three types of electrical power treatment which have been successfully employed to produce the device will be described.

In a first type of power treatment, a potential source of approximately 20 volts R. M. S. and a current-limiting resistor having a resistance of approximately 10 ohms are connected in series relation with the germanium body and the contact element which is placed in intimate contact therewith. Alternating-current pulses individually having a magnitude of the order of 1 ampere in the direction corresponding to the forward impedance of the device and a duration of the order of 1 second are then passed through the series combination of the crystal-contact device and the current-limiting resistor. Due to the contact impedance of the device between the germanium body and the gold portion of the contact element, the current pulses generate sufficient heat at the contact point to fuse the contact element to the germanium body.

In a second type of electrical power treatment, a unidirectional potential source of approximately 20 volts and a current-limiting resistor having a resistance of approximately 10 ohms are connected in a series relation with the crystal-contact device. To provide the fused contact, pulses of unidirectional current individually having a magnitude of the order of 1 ampere and a duration of the order of 1 second are then passed through the crystal-contact device in the direction of the lesser impedance thereof, namely, in the direction corresponding to the forward impedance of the device.

In a third type of power treatment, a capacitor having a capacitance of approximately 1 microfarad is charged to a voltage of the order of 20 volts. The capacitor is then connected across the crystal-contact device and discharged therethrough with the current flowing in the direction corresponding to the forward impedance of the device. In each of the above-described methods of producing the electrical crystal-contact device, the device may be tested after the application of each current pulse or a given number of pulses to determine when a desired electrical characteristic has been provided therefor. In each of the above-described methods also, it is seen that the fusing current is of a higher order of magnitude than the normal or rated current of such devices, which is generally less than 100 milliamperes.

Referring now to the drawing, there is represented a typical voltage-current characteristic of a device which has been produced by any of the methods described above. It will be seen that the characteristic exhibits a voltage peak in the third quadrant at a voltage of approximately −10 volts. This voltage peak is known as the turnover voltage. From the graph, it will also be seen that when a voltage of +½ volt is applied to the device, a current of the order of 100 milliamperes flows through the forward impedance thereof. Thus, the device has a forward impedance at the contact point of the order of 5 ohms, the bulk resistance of the device being negligible. Conversely, when a voltage of approximately −1 volt is applied to the device, a negligible current of the order of 50 microamperes flows through the reverse impedance of the device, indicating a reverse impedance of the order of 20,000 ohms.

For the purpose of comparing the voltage-current characteristic of a device constructed in accordance with the invention with the corresponding characteristic of a prior known device, a crystal-contact device comprising a crystalline body of germanium and a tungsten-contact element without gold plating was subjected to an electrical power treatment generally similar to that first described above. It was found that a positive voltage of approximately ½ volt causes a current flow of the order of 1 milliampere through the forward impedance while a negative voltage of 10 volts causes a current flow having a magnitude of the order of 100 microamperes through the reverse impedance. The turnover voltage of the device is a negative voltage of the order of 100 volts. Thus, the forward impedance of the prior known device with a positive voltage of ½ volt applied thereto is of the order of 500 ohms or about 100 times that of a device embodying the invention.

It will be seen, therefore, that a device constructed and manufactured in accordance with the method of the present invention has a forward impedance which is of a lower order of magnitude than the forward impedance of the known device described above. While the precise cause of this phenomenon remains obscure, it is believed that this greatly reduced forward impedance of a device manufactured in accordance with the method of the present invention is caused by the formation of a eutectic alloy of gold and germanium at the contact point during the power treatment.

From the foregoing description, it will be seen that a device constructed and manufactured in accordance with the method of the invention has the advantage of having a very low forward impedance.

While there have been described what are at present considered to be the preferred steps of the method of this invention, it will be obvious to those skilled in the art that various changes and modifications may be made therein without departing from the invention, and it is, therefore, aimed to cover all such changes and modifications as fall within the true spirit and scope of the invention.

What is claimed is:

1. The method of producing an electric crystal-contact device comprising: passing through a crystalline body of germanium and a contact element including a portion comprising gold maintained in intimate contact with said body an electric current of a higher order of magnitude than the normal conduction current of the device to fuse said contact element to said body.

2. The method of producing an electrical crystal-contact device comprising: passing through a crystalline body of germanium and a contact element including a portion comprising gold maintained in intimate contact with said body an electric current having a magnitude of the order of one ampere to fuse said contact element to said body.

3. The method of producing an electrical crystal-contact device comprising: passing pulses of alternating current individually having a magnitude of the order of one ampere through a crystalline body of germanium and a contact element including a portion comprising gold maintained in intimate contact with said body to fuse said contact element to said body.

4. The method of producing an electrical crystal-contact device comprising: passing pulses of alternating current individually having a magnitude of the order of one ampere and a duration of the order of one second through a crystalline body of germanium and a contact element including a portion comprising gold maintained in intimate contact with said body to fuse said contact element to said body.

5. The method of producing an electrical crystal-contact device comprising: passing in the direction corresponding to the lesser impedance of said device pulses of unidirectional current individually having a magnitude of the order of one ampere and a duration of the order of one second through a semiconductive crystalline body of germanium and a contact element including a portion comprising gold maintained in intimate contact with said body to fuse said contact element to said body.

RONALD WALTER DOUGLAS.
AUBREY O. E. LINDELL.

References Cited in the file of this patent

UNITED STATES PATENTS

| Number | Name | Date |
|---|---|---|
| 2,096,170 | Geisler | Oct. 19, 1937 |
| 2,145,651 | Funk | Jan. 31, 1939 |
| 2,239,770 | Becker et al. | Apr. 29, 1941 |
| 2,239,771 | Becker | Apr. 29, 1941 |
| 2,309,081 | Priessman et al. | Jan. 26, 1943 |
| 2,423,922 | Arndt, Jr. | July 15, 1947 |
| 2,524,035 | Bardeen et al. | Oct. 3, 1950 |
| 2,597,028 | Pfann | May 20, 1952 |

OTHER REFERENCES

North-Jour. of Applied Physics, November 1946, pp. 912–915. (Copy in Library.)

North-Jour. of Applied Physics, November 1946, pp. 916–923. (Copy in Library.)